(12) United States Patent
Huntington et al.

(10) Patent No.: US 10,315,150 B2
(45) Date of Patent: Jun. 11, 2019

(54) CARBON DIOXIDE RECOVERY

(71) Applicants: Richard A. Huntington, Spring, TX (US); Robert D. Denton, Bellaire, TX (US); Sulabh K. Dhanuka, Houston, TX (US)

(72) Inventors: Richard A. Huntington, Spring, TX (US); Robert D. Denton, Bellaire, TX (US); Sulabh K. Dhanuka, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 15/883,614

(22) Filed: Jan. 30, 2018

(65) Prior Publication Data

US 2018/0154300 A1 Jun. 7, 2018

Related U.S. Application Data

(62) Division of application No. 14/181,885, filed on Feb. 17, 2014, now abandoned.
(Continued)

(51) Int. Cl.
*B01D 53/00* (2006.01)
*F01K 5/02* (2006.01)
(Continued)

(52) U.S. Cl.
CPC .............. *B01D 53/002* (2013.01); *F01K 5/02* (2013.01); *F23C 9/00* (2013.01); *F23J 15/06* (2013.01); *F25J 3/0266* (2013.01); *B01D 53/1475* (2013.01); *B01D 53/75* (2013.01); *B01D 2251/306* (2013.01); *B01D 2256/22* (2013.01); *B01D 2257/102* (2013.01); *B01D 2257/80* (2013.01); *B01D 2258/0283* (2013.01); *C10L 3/104* (2013.01); *F01K 23/10* (2013.01);
(Continued)

(58) Field of Classification Search
CPC .. F25J 2210/70; F25J 2240/80–2240/90; F25J 3/0266
See application file for complete search history.

(56) References Cited

U.S. PATENT DOCUMENTS 2,488,911 A 11/1949 Hepburn et al.
2,884,758 A 5/1959 Oberle
(Continued)

FOREIGN PATENT DOCUMENTS

CA 2231749 9/1998
CA 2645450 9/2007
(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.
(Continued)

*Primary Examiner* — Tareq Alosh
(74) *Attorney, Agent, or Firm* — ExxonMobil Upstream Research Company—Law Department

(57) ABSTRACT

The present techniques are directed to a system and method for recovering carbon dioxide ($CO_2$). The method includes recovering the $CO_2$ from a gas mixture including the $CO_2$ via a $CO_2$ separation system. The $CO_2$ separation system includes a rotating freezer/melter.

18 Claims, 12 Drawing Sheets

Related U.S. Application Data

(60) Provisional application No. 61/775,164, filed on Mar. 8, 2013.

(51) Int. Cl.
   *F25J 3/02* (2006.01)
   *F23J 15/06* (2006.01)
   *F23C 9/00* (2006.01)
   *C10L 3/10* (2006.01)
   *B01D 53/14* (2006.01)
   *B01D 53/75* (2006.01)
   *F01K 23/10* (2006.01)

(52) U.S. Cl.
   CPC .... F23J 2900/15061 (2013.01); Y02E 20/326 (2013.01); Y02E 20/363 (2013.01)

(56) References Cited

U.S. PATENT DOCUMENTS

| | | |
|---|---|---|
| 3,561,895 A | 2/1971 | Michelson |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,467,722 A | 11/1995 | Meratla |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |

(56) References Cited

U.S. PATENT DOCUMENTS

| | | |
|---|---|---|
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,666 B1 | 9/2001 | Ginter |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,640,548 B2 | 11/2003 | Brushwood et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |

(56) References Cited

U.S. PATENT DOCUMENTS

| | | |
|---|---|---|
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |

(56) References Cited

U.S. PATENT DOCUMENTS

| | | |
|---|---|---|
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,555,796 B2 | 10/2013 | D'Agostini |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0037728 A1 | 11/2001 | Schimkat et al. |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |

(56) References Cited

U.S. PATENT DOCUMENTS

| | | |
|---|---|---|
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ELKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0024476 A1 | 2/2010 | Shah |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0089406 A1 | 4/2013 | Fort |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| EP | 0770771 | 5/1997 |
| GB | 0776269 | 6/1957 |
| GB | 2117053 | 10/1983 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm., CEC 500-2006-074*, 80 pgs.

Baxter, E. et al. (2003) "Fabricate and Test an Advanced Non-Polluting Turbine Drive Gas Generator," *U. S. Dept. of Energy, Nat'l Energy Tech. Lab., DE-FC26-00NT 40804*, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," KTH—Royal Institute Of Technology, Dept. of Chemical Engineering And Technology, 9 pgs.

Clark, Hal (2002) "Development of a Unique Gas Generator for a Non-Polluting Power Plant," *California Energy Commission Feasibility Analysis, P500-02-011F*, Mar. 2002, 42 pgs.

Foy, Kirsten et al. (2005) "Comparison of Ion Transport Membranes"— *Fourth Annual Conference on Carbon Capture and Sequestration, DOE/NETL*; May 2005, 11 pages.

Cho, J. H. et al. (2005) "Marrying LNG and Power Generation," *Energy Markets*; Oct./Nov. 2005; 10, 8; ABI/INFORM Trade & Industry, p. 28.

(56) References Cited

OTHER PUBLICATIONS

Ciulia, Vincent "Auto Repair. How the Engine Works," About.com. 2001-2003.
Corti, A. et al. (1988) "Athabasca Mineable Oil Sands: The RTR/Gulf Extraction Process Theoretical Model of Bitumen Detachment," *4th UNITAR/UNDP Int'l Conf. on Heavy Crude and Tar Sands Proceedings*, v.5, paper No. 81, Edmonton, AB, Canada, Aug. 7-12, 1988, pp. 41-44.
Cryogenics. Science Clarified. 2012. http://www.scienceclarified.com/Co-Di/Cryogenics.html.
Defrate, L. A. et al. (1959) "Optimum Design of Ejector Using Digital Computers" *Chem. Eng. Prog. Symp. Ser.*, 55 (21) pp. 46.
Ditaranto, M. et al. (2006) "Combustion Instabilities in Sudden Expansion Oxy-Fuel Flames," *ScienceDirect, Combustion And Flame*, v.146, Jun. 30, 2006, pp. 493-451.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara (2005) Licentiate Thesis, KTH—"Development of Methane Oxidation Catalysts for Different Gas Turbine Combustor Concepts." *The Royal Institute of Technology, Department of Chemical Engineering and Technology, Chemical Technology*, Stockholm Sweden, p. 22.
Ertesvag, I. S. et al. (2005) "Energy Analysis of a Gas-Turbine Combined-Cycle Power Plant With Precombustion $CO_2$ Capture," *Elsevier*, 2004 pp. 5-39.
Evulet, Andrei T. et al. (2009) "Application of Exhaust Gas Recirculation in a DLN F-Class Combustion System for Post Combustion Carbon Capture" *ASME J. Engineering for Gas Turbines and Power*, v131, May 2009.
Evulet, Andrei T. et al. (2009) "On the Performance and Operability of GE's Dry Low Nox Combustors utilizing Exhaust Gas Recirculation for Post-Combustion Carbon Capture" *Energy Procedia*, pp. 3809-3816.
http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Nanda, R. et al. (2007) "Utilizing Air Based Technologies as Heat Source for LNG Vaporization," presented at the 86th Annual convention of the *Gas Processors of America* (GPA 2007), Mar. 11-14, 2007, San Antonio, TX.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Rosetta, M. J. et al. (2006) "Integrating Ambient Air Vaporization Technology with Waste Heat Recovery—A Fresh Approach to LNG Vaporization," presented at the 85th annual convention of the *Gas Processors of America* (GPA 2006), Grapevine, Texas, Mar. 5-8, 2006.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
VanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.
Zhu, J. et al. (2002) "Recovery of Coalbed Methane by Gas Injection," *SPE 75255*, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, filed Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, filed Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

100

400

1100

CARBON DIOXIDE RECOVERY

CROSS REFERENCE TO RELATED APPLICATIONS

This application is a divisional of U.S. patent application Ser. No. 14/181,885 filed on Feb. 17, 2014 which claims the priority benefit of U.S. Patent Application 61/775,164 filed Mar. 8, 2013 entitled CARBON DIOXIDE RECOVERY, the entirety of which is incorporated herein by reference for all purposes.

FIELD OF THE INVENTION

The present disclosure relates generally to carbon dioxide ($CO_2$) recovery. More particularly, the present disclosure relates to systems and methods for recovering $CO_2$ from a gas mixture via a $CO_2$ separation system that includes a rotating freezer/melter.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

A conventional gas turbine engine often has a turbine compressor that is mechanically linked to an expander turbine through a shaft. The turbine compressor can be used to compress a flow of air ingested by the turbine compressor. The compressed air is then flowed to a combustor. In the combustor, fuel is injected and ignited to create a continuous flame. The high pressure exhaust gases from the flame are flowed into the expander turbine, which generates mechanical energy from the exhaust gas as it expands.

The exhaust gas may include a mixture of nitrogen ($N_2$), carbon dioxide ($CO_2$), water ($H_2O$), and any number of other gaseous components. In some cases, it may be desirable to remove at least a portion of the $CO_2$ from the exhaust gas as a $CO_2$ product. According to current techniques, solvent based separation processes, amine processes, pressure swing adsorption processes, or the like are used to recover the desired $CO_2$ product. However, the $CO_2$ product that is recovered using such processes is at a low pressure and must be compressed as a gas to a high pressure for use in enhanced oil recovery (EOR) or carbon storage applications.

One technique for removing $CO_2$ from the flue gas of a power station is described in U.S. Patent Application Publication No. 2011/0226010 by Baxter. Moisture is removed from the flue gas to yield a dried flue gas, and the dried flue gas is compressed to yield a compressed flue gas. The temperature of the compressed flue gas is then decreased using a first heat exchanger and a second heat exchanger. At least a portion of the $CO_2$ within the compressed flue gas condenses within the first and second heat exchangers, yielding a solid or liquid condensed-phase $CO_2$ component and a light-gas component. The condensed-phase $CO_2$ component can then be recovered. However, recovering the $CO_2$ product from the flue gas using such techniques may be costly due to the high degree of compression that is required.

SUMMARY

An exemplary embodiment of the present techniques provides a system for recovering carbon dioxide ($CO_2$). The system includes a $CO_2$ separation system configured to recover the $CO_2$ from a gas mixture. The $CO_2$ separation system includes a rotating freezer/melter.

Another exemplary embodiment provides a method for recovering carbon dioxide ($CO_2$). The method includes recovering the $CO_2$ from a gas mixture including the $CO_2$ via a $CO_2$ separation system. The $CO_2$ separation system includes a rotating freezer/melter.

Another exemplary embodiment provides a rotating freezer/melter for recovering carbon dioxide ($CO_2$) from a gas mixture. The rotating freezer/melter includes a freezing zone, a melting zone, and a rotor configured to rotate through the freezing zone and the melting zone. Solid $CO_2$ formed from a gas mixture is captured on the rotor while the rotor is rotating through the freezing zone, and the solid $CO_2$ melts and flows through the rotor as liquid $CO_2$ while the rotor is rotating through the melting zone.

BRIEF DESCRIPTION OF THE DRAWINGS

The advantages of the present techniques are better understood by referring to the following detailed description and the attached drawings, in which.

DETAILED DESCRIPTION

Figure 1:
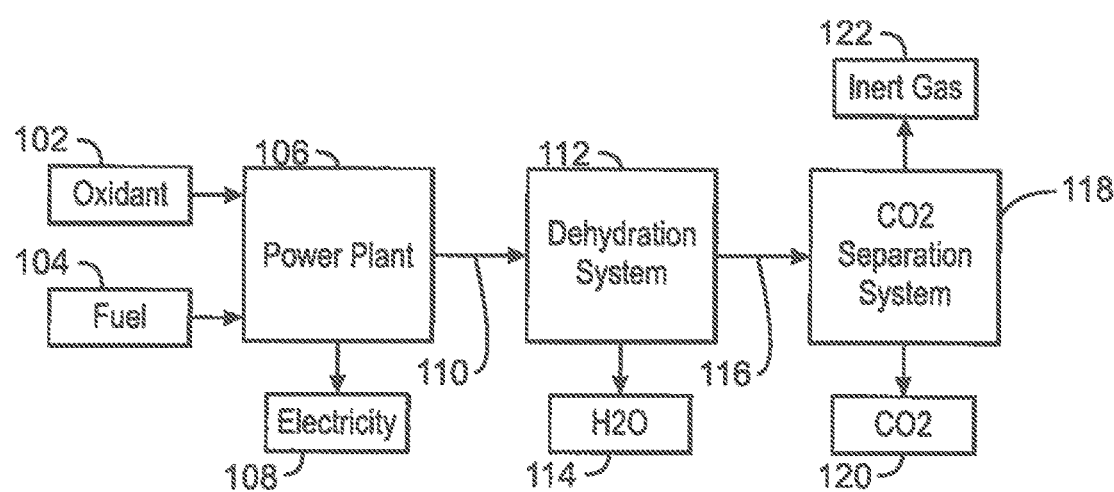
FIG. 1 is a block diagram of a system for power generation and carbon dioxide ($CO_2$) recovery.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

A "combined cycle power plant" is generally the combination of an open Brayton Cycle and a Rankine cycle. Combined cycle power plants typically use both steam and gas turbines to generate power, although other working fluids besides water and steam may be used in the Rankine cycle. The combined cycle gas/steam power plants generally have a higher energy conversion efficiency than gas or steam only plants. A combined cycle plant's efficiencies can be as high as 50% to 60% of a lower heating value (LHV). The higher combined cycle efficiencies result from synergistic utilization of a combination of the gas turbine with the steam turbine. Typically, combined cycle power plants utilize heat from the gas turbine exhaust to boil water to generate steam. The boilers in typical combined cycle plants can be referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

As used herein, a "compressor" includes any type of equipment designed to increase the pressure of a fluid or working fluid, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example. For example, a compressor may be a first stage in a gas turbine engine, as discussed in further detail below.

As used herein, "cooling" broadly refers to lowering and/or dropping a temperature and/or internal energy of a substance, such as by any suitable amount. Cooling may include a temperature drop of at least about 1 degree Celsius, at least about 5 degrees Celsius, at least about 10 degrees Celsius, at least about 15 degrees Celsius, at least about 25 degrees Celsius, at least about 50 degrees Celsius, at least about 100 degrees Celsius, and/or the like. The cooling may use any suitable heat sink, such as steam generation, hot water heating, cooling water, air, refrigerant, other process streams (integration), and combinations thereof. One or more sources of cooling may be combined and/or cascaded to reach a desired outlet temperature. The cooling step may use a cooling unit with any suitable device and/or equipment. According to one embodiment, cooling may include indirect heat exchange, such as with one or more heat exchangers. Heat exchangers may include any suitable design, such as shell and tube, plate and frame, counter current, concurrent, extended surface, and/or the like. In the alternative, the cooling may use evaporative (heat of vaporization) cooling and/or direct heat exchange, such as a liquid sprayed directly into a process stream.

"Cryogenic temperature" refers to a temperature that is about −50° C. or below.

A "diluent" is a gas used to lower the concentration of an oxidant fed to a gas turbine to combust a fuel, a gas used to lower the concentration of a fuel fed to a gas turbine that is combusted with an oxidant, a gas used to reduce the temperature of the products of combustion of a fuel and an oxidant fed to a gas turbine, or any combination thereof. The diluent may be an excess of nitrogen, carbon dioxide, combustion exhaust, or any number of other gases. In embodiments, the diluent may also provide cooling to a combustor.

"Enhanced oil recovery" or "EOR" refers to processes for enhancing the recovery of hydrocarbons from subterranean reservoirs by the introduction of materials not naturally occurring in the reservoir.

An "equivalence ratio" refers to the mass ratio of fuel to oxygen entering a combustor divided by the mass ratio of fuel to oxygen when the ratio is stoichiometric. A perfect combustion of fuel and oxygen to form carbon dioxide and water would have an equivalence ratio of 1. A too lean mixture, e.g., having more oxygen than fuel, would provide an equivalence ratio less than 1, while a too rich mixture, e.g., having more fuel than oxygen, would provide an equivalence ratio greater than 1.

A "fuel" includes any number of hydrocarbons that may be combusted with an oxidant to power a gas turbine. Such hydrocarbons may include natural gas, treated natural gas, kerosene, gasoline, or any number of other natural or synthetic hydrocarbons. In one embodiment, natural gas from an oil field is purified and used to power the turbine. In another embodiment, a reformed gas, for example, created by processing a hydrocarbon in a steam reforming process may be used to power the turbine.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "gas turbine engine" operates on the Brayton cycle. If the exhaust gas is vented to the atmosphere, this is termed an open Brayton cycle, while recycling of the exhaust gas gives a closed Brayton cycle. As used herein, a "gas turbine" typically includes a compressor section, a number of combustors, and an expander turbine section. The compressor may be used to compress an oxidant, which is mixed with a fuel and channeled to the combustors. The mixture of fuel and oxidant is then ignited to generate hot combustion gases. The combustion gases are channeled to the expander turbine section which extracts energy from the combustion gases for powering the compressor, as well as producing useful work to power a load. In embodiments discussed herein, the oxidant may be provided to the combustors by an external compressor, which may or may not be mechanically linked to the shaft of the gas turbine engine. Further, in embodiments, the compressor section may be used to compress a diluent, such as recycled exhaust gases, which may be fed to the combustors as a coolant.

A "heat exchanger" broadly means any device capable of transferring heat from one media to another media, including particularly any structure, e.g., device commonly referred to as a heat exchanger. Heat exchangers include "direct heat exchangers" and "indirect heat exchangers." Thus, a heat exchanger may be a plate-and-frame, shell-and-tube, spiral, hairpin, core, core-and-kettle, double-pipe or any other type of known heat exchanger. "Heat exchanger" may also refer to any column, tower, unit or other arrangement adapted to allow the passage of one or more streams therethrough, and to affect direct or indirect heat exchange between one or more lines of refrigerant, and one or more feed streams.

A "heat recovery steam generator" or "HRSG" is a heat exchanger or boiler that recovers heat from a hot gas stream. It produces steam that can be used in a process or used to drive a steam turbine. A common application for an HRSG is in a combined-cycle power plant, where hot exhaust from a gas turbine is fed to the HRSG to generate steam which in turn drives a steam turbine. This combination produces electricity more efficiently than either the gas turbine or steam turbine alone.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., carbon dioxide or hydrogen sulfide), or any combinations thereof. The natural gas can also contain minor amounts of contaminants such as water, nitrogen, iron sulfide, wax, crude oil, or any combinations thereof. The natural gas stream may be substantially purified prior to use in embodiments, so as to remove compounds that may act as poisons.

An "oxidant" is a gas mixture that can be flowed into the combustors of a gas turbine engine to combust a fuel. As used herein, the oxidant may be oxygen mixed with any number of other gases as diluents, including carbon dioxide ($CO_2$), nitrogen ($N_2$), air, combustion exhaust, and the like. Other gases that function as oxidizers may be present in the oxidant mixture in addition to oxygen, including ozone, hydrogen peroxide, NOxs, and the like.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Embodiments described herein provide a system and method for recovering $CO_2$ from a gas mixture via a $CO_2$ separation system that includes a rotating freezer/melter. More specifically, embodiments described herein provide a system and method for recovering $CO_2$ from an exhaust gas exiting a power plant or a natural gas stream including $CO_2$, for example. For example, in various embodiments, power is generated via a power plant, and $CO_2$ is recovered from the exhaust gas exiting the power plant. According to such embodiments, a gas mixture including $CO_2$, $H_2O$, and inert gas is generated by a power plant during the generation of power. A dehydration system dehydrates the gas mixture, and a $CO_2$ separation system recovers the $CO_2$ from the dehydrated gas mixture. Furthermore, according to embodiments described herein, the $CO_2$ separation system includes a rotating freezer/melter for recovering the $CO_2$ from the dehydrated gas mixture.

Systems for Power Generation and $CO_2$ Recovery

FIG. 1 is a block diagram of a system 100 for power generation and $CO_2$ recovery. In the system 100, oxidant 102 and fuel gas 104 are provided to a power plant 106, for example, a gas turbine generator (GTG), at a substantially stoichiometric ratio. The oxidant 102 can be air having about 78% $N_2$ and about 21% oxygen and, thus, the ratio would be calculated between the fuel gas 104 and the oxygen portion of the oxidant 102. The fuel gas 102 and oxygen are substantially completely combusted in the GTG of the power plant 106 to form an exhaust gas that includes $CO_2$, $H_2O$, and inert gas such as $N_2$. The exhaust gas may also include trace amounts of carbon monoxide (CO), nitrogen oxides (NOx), oxygen ($O_2$), and fuel. The energy from the exhaust gas is used to drive an expander turbine that turns a shaft. A generator coupled to the shaft generates electricity 108.

In some embodiments, the power plant 106 is a semi-closed Brayton cycle power plant. The power plant 106 may be a combined cycle power plant that includes both a semi-closed Brayton cycle and a Rankine cycle. In such embodiments, the exhaust stream from the expander turbine of the semi-closed Brayton cycle can be used to boil water or other heat transfer fluids in a heat recovery steam generator (HRSG) that can be used to power the Rankine cycle power plant. In the Rankine cycle power plant, the steam or other vapor can be used to drive a turbine and generate more electricity 108.

The treated stream from the power plant 106 forms a gas mixture 110. The gas mixture 110 may include primarily $CO_2$, $H_2O$, and inert gas. The gas mixture 110 is flowed through a dehydration system 112, in which the $H_2O$ 114 is separated from the $CO_2$ and inert gas within the gas mixture 110.

The dehydrated gas mixture 116 is then flowed into a $CO_2$ separation system 118. Within the $CO_2$ separation system 118, the $CO_2$ 120 is separated from the inert gas 122 within the dehydrated gas mixture 116. In various embodiments, this is accomplished using a rotating freezer/melter within the $CO_2$ separation system 118, as discussed further with respect to FIGS. 3-10.

The block diagram of FIG. 1 is not intended to indicate that the system 100 is to include all of the components shown in FIG. 1. Moreover, the system 100 may include any number of additional components not shown in FIG. 1, depending on the details of the specific implementation. For example, in various embodiments, the gas mixture 110 is flowed through a precooler before being flowed into the dehydration system 112. The precooler may lower the temperature of the gas mixture 110 in preparation for the recovery of the $CO_2$ 120 from the gas mixture 110.

Figure 2:
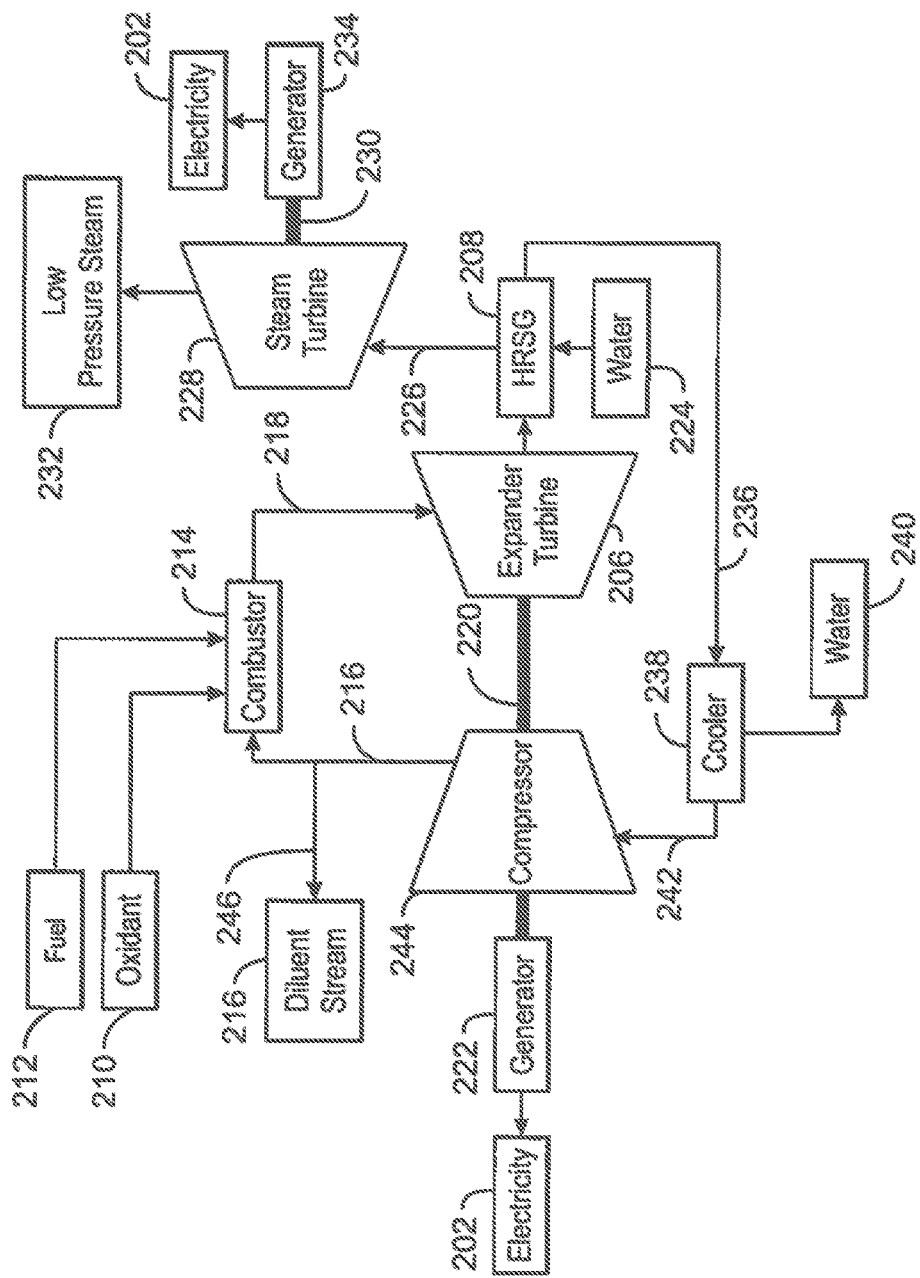
FIG. 2 is a process flow diagram of a combined cycle power plant that can be used to produce electricity and generate a diluent gas mixture including $CO_2$.

FIG. 2 is a process flow diagram of a combined cycle power plant 200 that can be used to produce electricity 202 and generate a diluent gas mixture including $CO_2$. In various embodiments, the combined cycle power plant 200 includes a semi-closed Brayton cycle including, for example, an expander turbine 206, and a Rankine cycle including, for example, a HRSG 208.

Within the combined cycle power plant 200, oxidant 210 and fuel gas 212 are fed to a combustor 214 to be burned. A compressed diluent stream 216 is also fed to the combustor 214 to lower the total amount of oxidant 201 and fuel gas 212 that is used, which allows the combustion process to be run at near stoichiometric conditions without overheating the combustor 214 or the expander turbine 206. As a result, the amount of $O_2$ and CO generated in the combustion process is decreased, and hot exhaust gas 218 exiting the combustor includes mostly $CO_2$, $H_2O$, and $N_2$, in addition to some trace gases, such as CO, $H_2$ and NOx.

The oxidant 210 and fuel gas 212 pressures may be increased, for example, using compressors, to boost the pressure to match the injection pressure of the compressed diluent stream 216 at the combustor 214. The hot exhaust gas 218 from the combustor 214 is flowed to the expander turbine 206, which uses the energy of the hot exhaust gas 218 to spin a shaft 220. The shaft 220 provides mechanical energy to a compressor, completing the Brayton cycle. The shaft 220 may also provide mechanical energy to an electric generator 222 to generate electricity 202. The electric generator 222 may be directly coupled to the shaft 220 from the expander turbine 206, or may be coupled to the shaft 220 by a gear box, clutch, or other device.

From the expander turbine 206, the hot exhaust gas 218 is flowed to the HRSG 208. The HRSG 208 may boil a water stream 224 with the energy from the hot exhaust gas 218 to generate steam 226. The steam 226 that is generated can be used to drive a steam turbine 228 and spin a shaft 230. After exiting the steam turbine 228, the resulting low pressure steam 232 can be cooled and condensed, and can be used as the water stream 224 to feed the HRSG 208.

The shaft 230 from the steam turbine 228 can provide mechanical energy to an electric generator 234 to generate the electricity 202, or may be used power other devices, such as compressors. The electric generator 234 may be directly coupled to the shaft 230 from the steam turbine 228, or may be coupled to the shaft 230 by a gear box, clutch, or other device. Further, in the embodiment shown in FIG. 2, the expander turbine 206 and the steam turbine 228 are coupled to separate electric generators 222 and 234. However, it is to be understood that the expander turbine 206 and the steam turbine 228 may also be coupled, directly or indirectly, to one common electric generator.

The hot gas stream 236 exiting the HRSG 208 is flowed to a cooler 238. The cooler 238 chills the hot gas stream 236, causing the water vapor formed in the combustion process to condense out, allowing its removal as a separate water stream 240. After removal of the water stream 240, the chilled gas mixture 242 is provided to a compressor 244 for recompression, prior to feeding the compressed diluent stream 216 to the combustor 214 to aid in cooling the combustor 214. The recycling of the hot gas stream 236 as the diluent stream 216 partially closes the Brayton cycle in the combined cycle power plant 200, resulting in a semi-closed Brayton cycle.

As the fuel gas 212 and the oxidant 210 are continuously being fed to the combined cycle power plant 200 to maintain the combustion, a portion 246 of the diluent stream 216 is continuously removed to maintain the mass balance in the semi-closed Brayton cycle. The diluent stream 216 may include $CO_2$, $H_2O$, and inert gas.

According to embodiments described herein, the diluent stream 216 exiting the combined cycle power plant 200 is flowed into a dehydration system, in which the $H_2O$ is removed from the diluent stream 216. The dehydrated diluent stream 216 is then flowed into a $CO_2$ separation system. Within the $CO_2$ separation system, the $CO_2$ is recovered from the diluent stream 216 using a rotating freezer/melter. The process of recovering the $CO_2$ from the diluent stream 216 is discussed further with respect to FIGS. 3-10.

Figure 3:
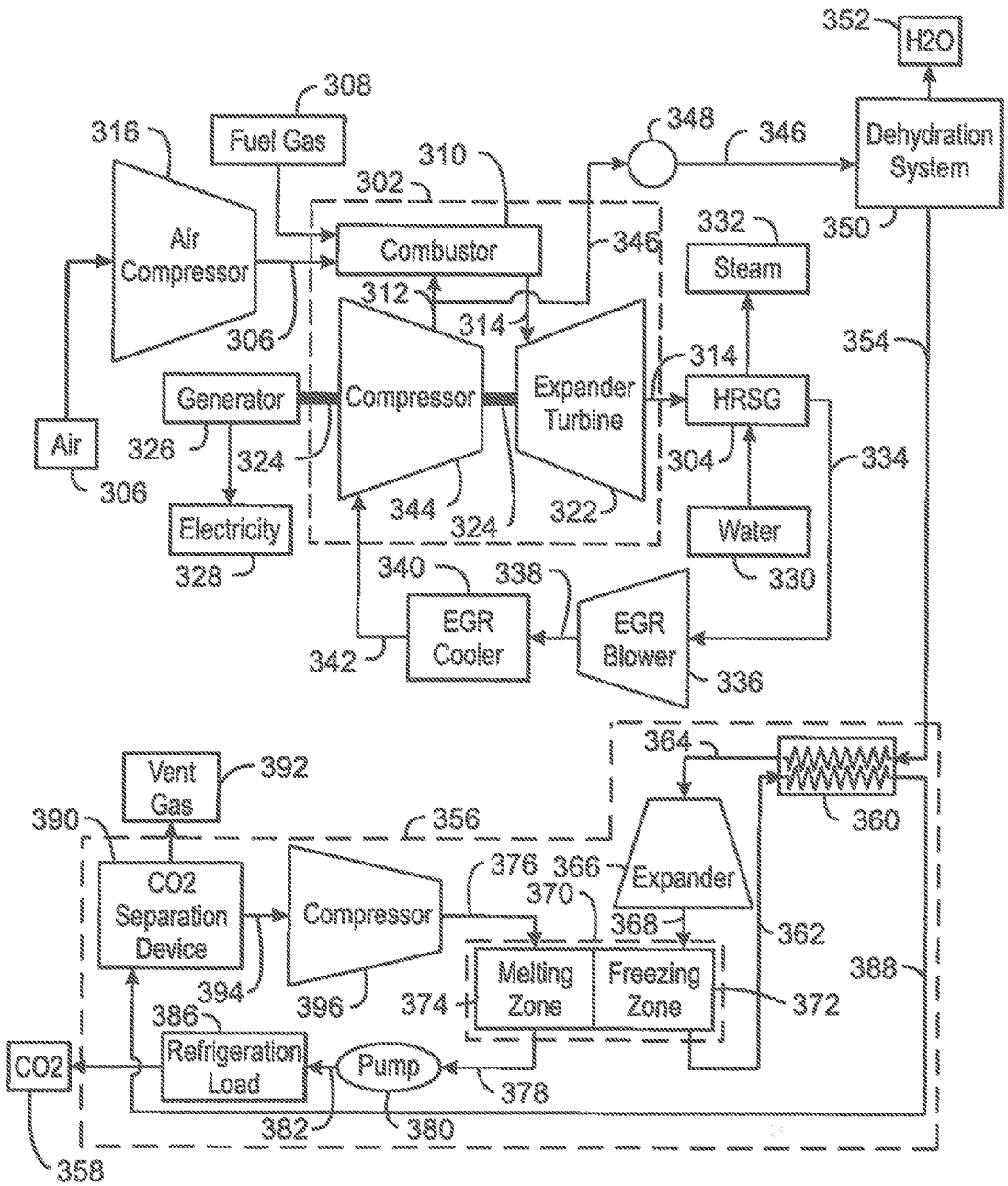
FIG. 3 is a process flow diagram of a system for low emissions power generation and $CO_2$ recovery.

FIG. 3 is a process flow diagram of a system 300 for low emissions power generation and $CO_2$ recovery. The system 300 provides for low emissions power generation using a combined cycle power plant including a semi-closed Brayton cycle that utilizes a gas turbine engine 302 and a Rankine cycle that utilizes an HRSG 304. In addition, the system 300 provides for the recovery of $CO_2$ from exhaust gases exiting the combined cycle power plant.

As shown in FIG. 3, air 306 and fuel gas 308 are fed to a combustor 310 to be burned within the semi-closed Brayton cycle. While air 306 is used as the oxidant in the embodiment shown in FIG. 3, it is to be understood that any other suitable type of oxidant may also be used in conjunction with the system 300.

A compressed diluent stream 312 is also fed to the combustor 310 to lower the total amount of air 306 and fuel gas 308 that is utilized for the combustion process. This may allow the combustion process to be run at or near stoichiometric conditions without overheating. As a result, the amount of $O_2$ and CO generated in the combustion process is decreased, and hot exhaust gas 314 exiting the combustor includes mostly $CO_2$, $H_2O$, and inert gas such as $N_2$.

The air 306 and fuel gas 308 pressures may be increased, for example, using compressors, to boost the pressure to match the injection pressure of the compressed diluent stream 312 at the combustor 310. For example, according to the embodiment shown in FIG. 3, the air 306 is compressed within an air compressor 316. The air compressor 316 includes at least one compression stage, and may include intercoolers, knock out drums, and any other suitable equipment. The compressed air 306 is then fed into the combustor 310 to be burned.

The hot exhaust gas 314 from the combustor 310 is flowed to an expander turbine 322 of the gas turbine engine 302, which uses the energy of the hot exhaust gas 314 to spin a shaft 324. The shaft 324 provides mechanical energy to an electric generator 326 to generate electricity 328. The electric generator 326 may be directly coupled to the shaft 324 from the expander turbine 322, or may be coupled to the shaft 324 by a gear box, clutch, or other device.

From the expander turbine 322, the hot exhaust gas 314 is flowed to the HRSG 304 within the Rankine cycle of the combined cycle power plant. The HRSG 304 boils a water stream 330 to generate steam 332 with the energy from the hot exhaust gas 314. In various embodiments, the generated steam 332 is used to drive the steam turbine, which uses the energy of the steam 332 to spin a shaft. The shaft may provide mechanical energy to an electric generator to generate additional electricity.

The hot gas stream 334 exiting the HRSG 304 is flowed to an exhaust gas recirculation (EGR) blower 336. The EGR blower 336 compresses the hot gas stream 334 and feeds the resulting compressed gas stream 338 into an EGR cooler 340. The EGR cooler 340 chills the compressed gas stream 338, producing a diluent stream 342. Cooling the hot gas stream 334 may also condense out water, drying the diluent stream 342.

The diluent stream 342 is then fed into a compressor 344. The compressor 344 compresses the diluent stream 342, producing the compressed diluent stream 312. In the embodiment shown in FIG. 3, the compressor 344 is coupled to the shaft 324, and the mechanical energy provided by the spinning of the shaft 324 by the expander turbine 322 is used to drive the compressor 344.

From the compressor 344, the compressed diluent stream 312 is fed to the combustor 310 to aid in cooling the combustor 310. The recycling of the hot gas stream 334 as the compressed diluent stream 312 partially closes the Brayton cycle in the combined cycle power plant, resulting in the semi-closed Brayton cycle.

As the air 306 and the fuel gas 308 are continuously being fed to the combustor 310 to maintain the combustion process, at least a portion of the compressed diluent stream 312 is continuously removed. For example, a portion of the diluent stream 312 may be removed as a gas mixture 346 including primarily $CO_2$, $H_2O$, and inert gas.

In some embodiments, the gas mixture 346 may be extracted from the combustor 310 after it has been burned and used to drive the expander turbine 322. For example, the gas mixture 346 may be extracted from the expander turbine 322 at about 2206 kilopascals (kPa) and 427 degrees Celsius (° C.). The gas mixture 346 is then cooled using a purge cooler 348 and, optionally, used to generate steam 332 within the HRSG 304.

After the gas mixture 346 has been cooled within the purge cooler 348, the gas mixture 346 is fed into a dehydration system 350. Within the dehydration system 350, the gas mixture 346 is dehydrated to remove the $H_2O$ 352. In various embodiments, the gas mixture 346 is dehydrated such that there is a very low amount of $H_2O$ 352 remaining in the gas mixture 346. For example, the dew point of the resulting dehydrated gas mixture 354 may be less than about −70° C., or lower. The resulting dehydrated gas mixture 354 exiting the dehydration system 350 may be at about 2206 kPa and 49° C.

The dehydrated gas mixture 354 is flowed into a $CO_2$ separation system 356 for the recovery of the $CO_2$ 358 from the dehydrated gas mixture 354. Specifically, the dehydrated gas mixture 354 is flowed into a heat exchanger 360 within the $CO_2$ separation system 356. Within the heat exchanger 360, the dehydrated gas mixture 354 is cooled to about −68° C. via indirect heat exchange with a low-temperature inert gas stream 362.

From the heat exchanger 360, the resulting low-temperature gas mixture 364 is flowed through a cryogenic expander 366. The cryogenic expander 366 lowers the pressure and temperature of the low-temperature gas mixture 364 to about 138 kPa and −101° C., respectively. At this condition, a portion of the $CO_2$ within the gas mixture 364 freezes to pure solid $CO_2$, resulting in the generation of a multiphase stream 368 including solid $CO_2$ and inert gas including some amount of residual $CO_2$.

The multiphase stream 368 is flowed into a rotating freezer/melter 370 including a freezing zone 372, a melting zone 374, and a rotor (not shown) that rotates throughout both the freezing zone 372 and the melting zone 374. Specifically, the multiphase stream 368 is flowed into the freezing zone 372 of the rotating freezer/melter 370. The rotor provides a porous media upon which the solid $CO_2$ within the multiphase stream 368 crystallizes and accumulates. The rotor also allows the inert gas including the residual $CO_2$ to pass through the porous media and exit the rotating freezer/melter as the low-temperature inert gas stream 362 at about 138 kPa and −101° C.

As the rotor rotates through the rotating freezer/melter 370, the solid $CO_2$ that has accumulated on the rotor enters the melting zone 374 of the rotating freezer/melter 370. Within the melting zone 374 of the rotating freezer/melter 370, the solid $CO_2$ is melted via contact with a high-pressure, high-temperature $CO_2$ stream 376 flowing though the melting zone 374. The resulting liquid $CO_2$ 378 flows through the rotor and exits the rotating freezer/melter 370 at about 1,034 kPa and −44° C.

The liquid $CO_2$ 378 is pumped to a pressure and temperature of about 13,790 kPa and −39° C. via a pump 380. The high-pressure liquid $CO_2$ 382 is converted to a vapor $CO_2$ stream via a refrigeration load 386 of about 33 MBTU/hr. The refrigeration load 386 may be internal or external to the combined cycle power plant and the $CO_2$ recovery system 356. In some embodiments, if the refrigeration load 386 is internal to the combined cycle power plant or the $CO_2$ recovery system 356, the refrigeration load 386 can be used to chill cooling water for the EGR cooler 340. In other embodiments, if the refrigeration load 386 is external to the combined cycle power plant and the $CO_2$ recovery system 356, the refrigeration load 386 can be used to enhance the recovery of natural gas liquids from a hydrocarbon reservoir, for example. The vapor $CO_2$ stream is then flowed out of the system 300 as the final $CO_2$ product 358. The final $CO_2$ product 358 may be used for EOR operations, or the $CO_2$ may be sequestered in a carbon storage system, such as a subterranean saline aquifer or depleted oil or gas reservoir, for example.

The inert gas stream 362 exiting the freezing zone 372 of the rotating freezer/melter 370 may include about 93.8% nitrogen, 5.0% carbon dioxide, and 1.12% argon, for example. The inert gas stream 362 is used to cool the dehydrated gas mixture 354 within the heat exchanger 360, resulting in the generation of a high-temperature inert gas stream 388 at about 103 kPa and 35° C.

After removal of most the $CO_2$ from the multiphase stream on the melting zone 374 of the rotating freezer/melter 370, the resulting high-temperature inert gas stream 388 is flowed into a $CO_2$ separation device 390. The $CO_2$ separation device 390 separates any remaining carbon dioxide from the nitrogen and argon within the high-temperature inert gas stream 388, resulting the generation of a vent gas stream 392 and a vapor $CO_2$ stream 394 at about 103 kPa and 38° C. In various embodiments, the $CO_2$ separation device 390 separates the carbon dioxide from the nitrogen and argon via an amine separation process, a potassium carbonate separation process, or any other suitable type of separation process.

The vapor $CO_2$ stream 394 is compressed within a compressor 396, producing the high-pressure, high-temperature $CO_2$ stream 376 at about 1,034 kPa and 38° C. The high-pressure, high-temperature $CO_2$ stream 376 is then flowed through the melting zone 374 of the rotating freezer/melter 370 and is used to melt the solid $CO_2$ that has accumulated on the rotor.

In some embodiments, the rotating freezer/melter 370 includes an additional zone for melting and removing accumulated water-ice that may result from inadequate dehydration of the gas mixture 354. For example, a portion of the vent gas stream 392 may be used to melt any accumulated water-ice within the additional zone. This de-icing procedure may be performed continuously or intermittently, depending on the details of the specific implementation.

Tables 1A and 1B list the properties of the streams flowing through various components of the system 300 of FIG. 3. However, it is to be understood that the streams flowing through the components of the system 300 of FIG. 3 are not limited to the properties shown in Tables 1A and 1B. Rather, the properties shown in Tables 1A and 1B merely represent one exemplary embodiment of the operation of the system 300 of FIG. 3.

that is included within the $CO_2$ separation system 356 of the system 300 of FIG. 3. Therefore, the system 400 of FIG. 4 may not recover as much $CO_2$ from the gas mixture 346

TABLE 1A

Properties of Streams Flowing through Various Components of FIG. 3

| Component Number | 354 | 358 | 362 | 364 | 366 | 368 | 368 | 376 |
|---|---|---|---|---|---|---|---|---|
| Phase | Vapor | Super Critical | Vapor | Vapor | | Vapor | Solid | Vapor |
| Mole flow rate (kmol/sec) | 10.76 | 1.17 | 9.98 | 10.76 | | 9.98 | 0.79 | 0.39 |
| Temperature (degC.) | 48.89 | 37.78 | −101.31 | −67.78 | | −101.31 | −101.31 | 37.78 |
| Pressure (kPa) | 2206 | 13720 | 138 | 2172 | | 138 | 138 | 1103 |
| External Power Added (MW) | | | | | | | | |
| External Heat Added (MW) | | | | | −26.68 | | | |
| Composition (mole fraction) | | | | | | | | |
| Water | 0.000 | 0.000 | 0.000 | 0.000 | | 0.000 | 0.000 | 0.000 |
| Nitrogen | 0.870 | 0.000 | 0.938 | 0.870 | | 0.938 | 0.000 | 0.000 |
| CO2 | 0.119 | 1.000 | 0.050 | 0.119 | | 0.050 | 1.000 | 1.000 |
| Argon | 0.010 | 0.000 | 0.011 | 0.010 | | 0.011 | 0.000 | 0.000 |
| Carbon Monoxide | 0.001 | 0.000 | 0.001 | 0.001 | | 0.001 | 0.000 | 0.000 |
| Total | 1.000 | 1.000 | 1.000 | 1.000 | | 1.000 | 1.000 | 1.000 |

TABLE 1B

Properties of Streams Flowing through Various Components of FIG 3.

| Component Number | 378 | 380 | 382 | 386 | 388 | 392 | 394 | 396 |
|---|---|---|---|---|---|---|---|---|
| Phase | Liquid | | Super Critical | | Vapor | Vapor | Vapor | |
| Mole flow rate (kmol/sec) | 1.17 | | 1.17 | | 9.98 | 9.59 | 0.39 | |
| Temperature (degC.) | −44.38 | | −39.63 | | 35.35 | 37.78 | 37.78 | |
| Pressure (kPa) | 1034 | | 13789 | | 103 | 103 | 103 | |
| External Power Added (MW) | | 0.85 | | | | | | 3.78 |
| External Heat Added (MW) | | | | 9.80 | | | | −3.92 |
| Composition (mole fraction) | | | | | | | | |
| Water | 0.000 | | 0.000 | | 0.000 | 0.000 | 0.000 | |
| Nitrogen | 0.000 | | 0.000 | | 0.938 | 0.976 | 0.000 | |
| CO2 | 1.000 | | 1.000 | | 0.050 | 0.012 | 1.000 | |
| Argon | 0.000 | | 0.000 | | 0.011 | 0.012 | 0.000 | |
| Carbon Monoxide | 0.000 | | 0.000 | | 0.001 | 0.001 | 0.000 | |
| Total | 1.000 | | 1.000 | | 1.000 | 1.000 | 1.000 | |

The process flow diagram of FIG. 3 is not intended to indicate that the system 300 is to include all of the components shown in FIG. 3. Moreover, the system 300 may include any number of additional components not shown in FIG. 3, depending on the details of the specific implementation.

It is to be understood that any number of alternatives to the rotating freezer/melter 370 may be used according to embodiments described herein. For example, the porous media of the rotating freezer/melter 370 may be arranged on a linear conveyor belt or similar device to pass the media successively through freezing and melting zones in a similar manner as described herein. In addition, similar functionality may be achieved by the use of a number of vessels that contain similar porous media that may be sequenced by the action of valves or similar devices from a freezing mode to a melting mode.

Figure 4:
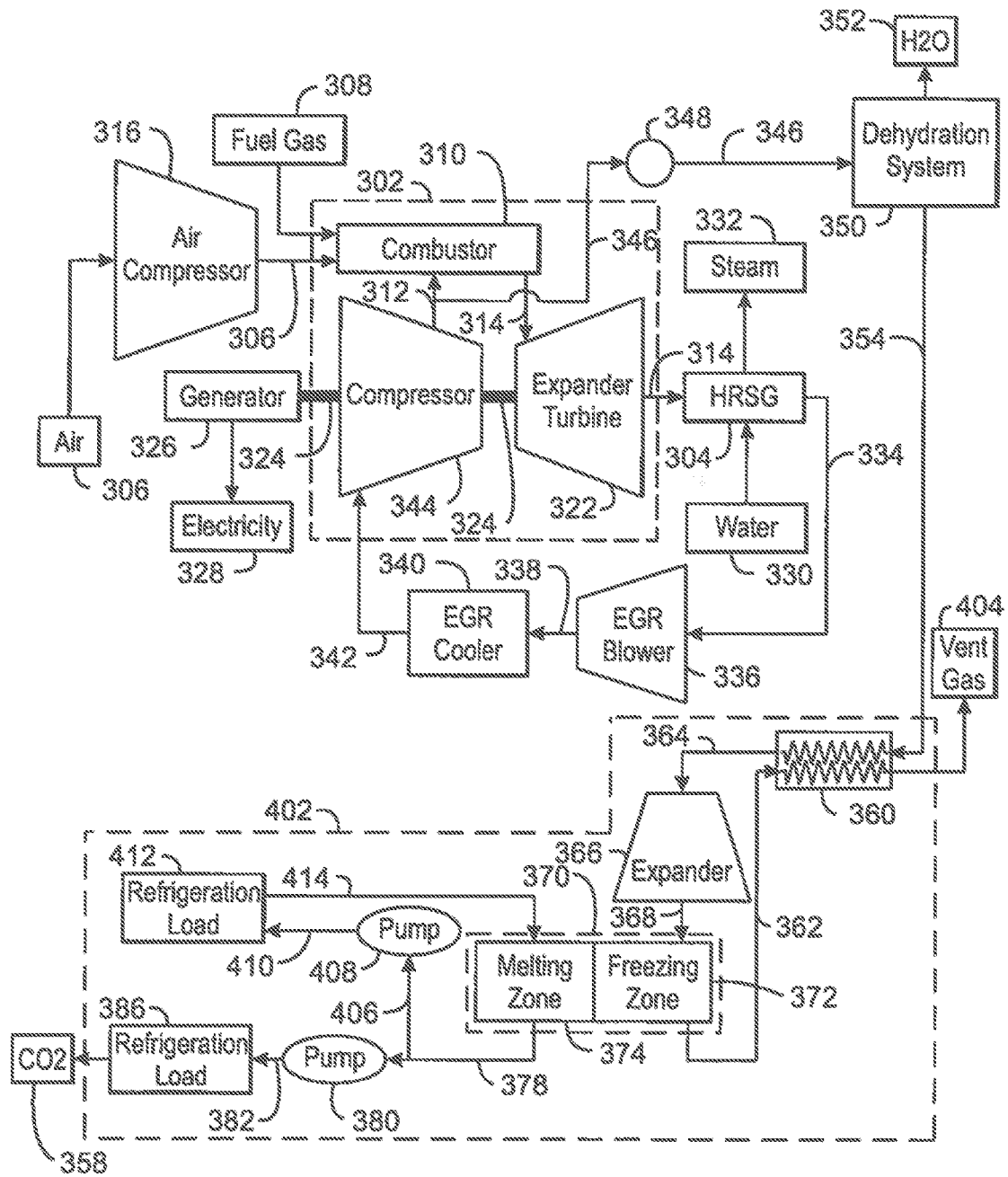
FIG. 4 is a process flow diagram of another system for low emissions power generation and $CO_2$ recovery.

FIG. 4 is a process flow diagram of another system 400 for low emissions power generation and $CO_2$ recovery. Like numbered items are as described with respect to FIG. 3. The system 400 of FIG. 4 is similar to the system 300 of FIG. 3. However, the $CO_2$ separation system 402 of the system 400 of FIG. 4 does not include the $CO_2$ separation device 390 exiting the combined cycle power plant as the system 300 of FIG. 3. For example, the system 300 of FIG. 3 may recover over 60% of the $CO_2$ from the gas mixture 346, while the system 400 of FIG. 4 may recover only about 60% or less of the $CO_2$ from the gas mixture 346.

As discussed with respect to the system 300 of FIG. 3, the inert gas stream 362 exiting the freezing zone 372 of the rotating freezer/melter 370 is used to cool the dehydrated gas mixture 354 within the heat exchanger 360, resulting in the generation of the high-temperature inert gas stream at about 103 kPa and 35° C. However, in contrast to the system 300 of FIG. 3, the high-temperature inert gas stream within the system 400 of FIG. 4 is not flowed to the $CO_2$ separation device 390 discussed with respect to FIG. 3. Rather, the high-temperature inert gas stream exiting the heat exchanger 360 is flowed out of the system 400 as a vent gas stream 404.

Furthermore, as discussed with respect to the system 300 of FIG. 3, the liquid $CO_2$ 378 exits the rotating freezer/melter 370 at about 1034 kPa and −44° C. However, instead of pumping all of the liquid $CO_2$ 378 out of the system 400 as the final $CO_2$ product 358, a portion 406, e.g., about 50%, of the liquid $CO_2$ 378 is removed upstream of the pump 380. The remaining portion of the liquid $CO_2$ 378 is then pumped to a pressure and temperature of about 13,790 kPa and −39° C. via the pump 380. The high-pressure liquid $CO_2$ 382 is converted to a vapor $CO_2$ stream via a refrigeration load 386 of about 33 MBTU/hr. The vapor $CO_2$ stream is then flowed out of the system 300 as the final $CO_2$ product 358.

The portion 406 of the liquid $CO_2$ 378 that is removed upstream of the pump 380 is flowed to a second pump 408. The second pump 408 increases the pressure of the liquid $CO_2$ 378 to about 1,103 kPa, generating a vapor $CO_2$ stream 410. The temperature of the vapor $CO_2$ stream 410 is increased to about 38° C. via a refrigeration load 412 of about 24 MBTU/hr. The resulting high-pressure, high-temperature $CO_2$ stream 414 is then flowed through the melting zone 374 of the rotating freezer/melter 370 and is used to melt the solid $CO_2$ that has accumulated on the rotor.

The process flow diagram of FIG. 4 is not intended to indicate that the system 400 is to include all of the components shown in FIG. 4. Moreover, the system 400 may include any number of additional components not shown in FIG. 4, depending on the details of the specific implementation. Further, it can be noted that the system described herein is not limited to using a combined cycle power plant, but may also be used with the exhaust from Rankine power plants, or other sources of $CO_2$ contaminated gases, such as high $CO_2$ content natural gas.

Rotating Freezer/Melter for $CO_2$ Recovery

Figure 5:
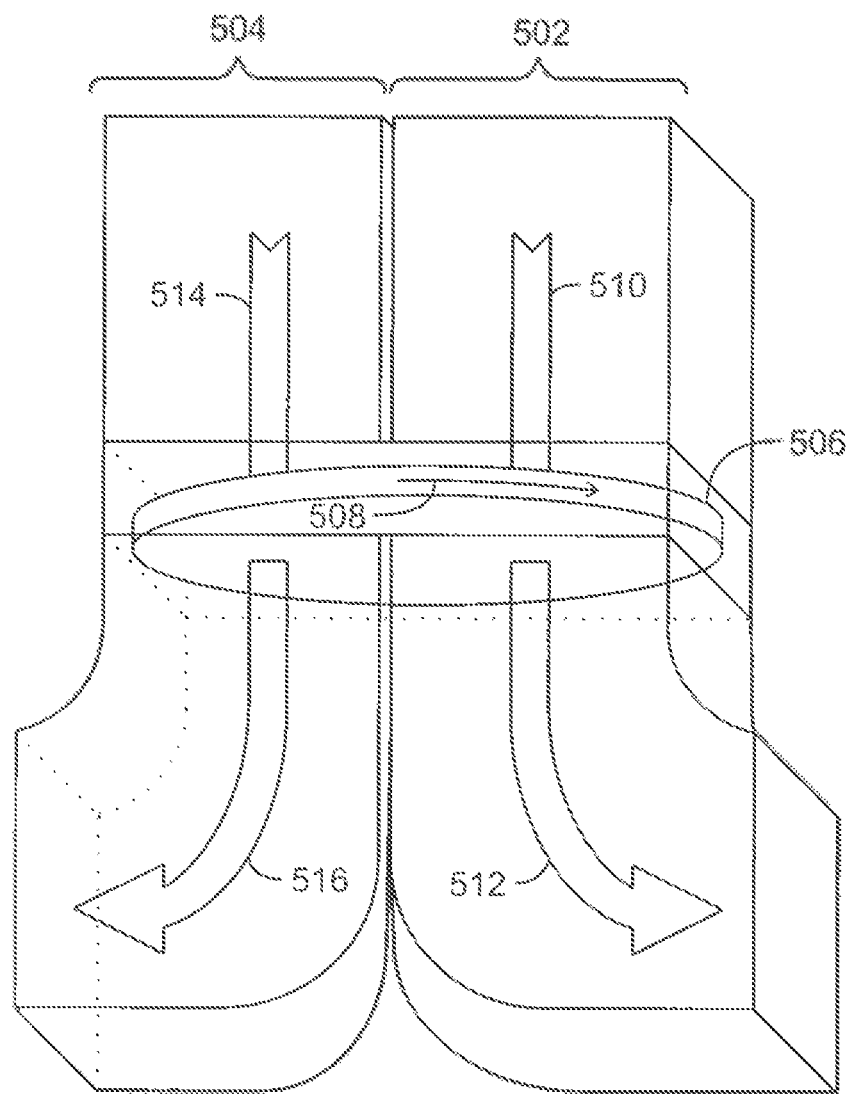
FIG. 5 is a perspective view of a rotating freezer/melter that may be used to recover $CO_2$ from a gas mixture.

FIG. 5 is a perspective view of a rotating freezer/melter 500 that may be used to recover $CO_2$ from a gas mixture. The rotating freezer/melter 500 of FIG. 5 may be used as the rotating freezer/melter 370 within the systems 300 and 400 of FIGS. 3 and 4.

The rotating freezer/melter 500 includes a freezing zone 502, a melting zone 504, and a rotor 506. The rotor 506 may continuously rotate through both the freezing zone 502 and the melting zone 504 of the rotating freezer/melter 500, as indicated by arrow 508. The rotor 506 may be constructed of crinkle wire mesh, packing, porous ceramic, or any other suitable porous material that provides enough surface area for solid $CO_2$ to accumulate on the rotor 506 without blocking the flow of gases or liquids through the rotor 506.

A multiphase stream 510 including solid $CO_2$ flows into the freezing zone 502 of the rotating freezer/melter 500. The solid $CO_2$ within the multiphase stream 510 crystallizes and accumulates on the rotor 506, while the inert gas flows through the rotor 506 and exits as an inert gas stream 512 including residual $CO_2$.

As the rotor rotates through the rotating freezer/melter 500, the solid $CO_2$ that has accumulated on the rotor 506 passes through the melting zone 504 of the rotating freezer/melter 500. Within the melting zone 504 of the rotating freezer/melter 500, the solid $CO_2$ comes in contact with a high-pressure, high-temperature $CO_2$ stream 514 flowing through the melting zone 504. As a result, the solid $CO_2$ is melted, and the high-pressure, high-temperature $CO_2$ stream is condensed, forming a combined liquid $CO_2$ stream 516. The liquid $CO_2$ stream 516 flows through the rotor 506 and out of the rotating freezer/melter 500 as the recovered $CO_2$ product.

FIG. 5 is not intended to indicate that the rotating freezer/melter 500 is to include all of the components shown in FIG. 5. Moreover, the rotating freezer/melter 500 may include any number of additional components not shown in FIG. 5, depending on the details of the specific implementation.

Figure 6:
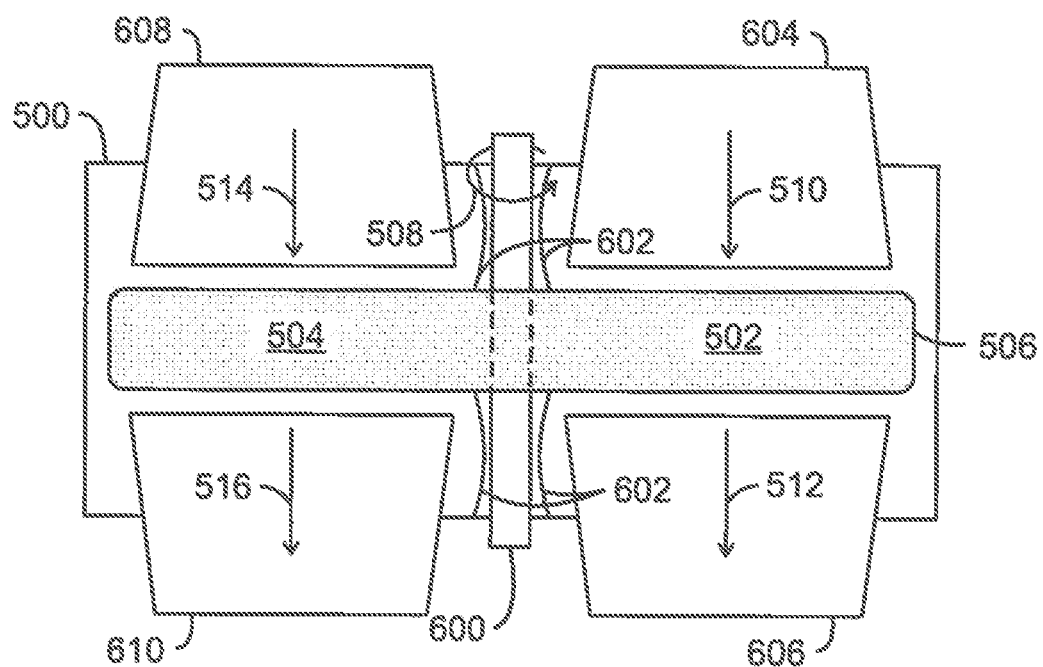
FIG. 6 is a cross-sectional view of the rotating freezer/melter that may be used to recover $CO_2$ from a gas mixture.

FIG. 6 is a cross-sectional view of the rotating freezer/melter 500 that may be used to recover $CO_2$ from a gas mixture. Like numbered items are as described with respect to FIG. 5. As shown in FIG. 6, the rotor 506 rotates about an axis 600 that extends through the center of the rotating freezer/melter 500.

According to embodiments described herein, only the solid $CO_2$ that has accumulated on the rotor 506 is to be allowed to pass directly from the freezing zone 502 to the melting zone 504 of the rotating freezer/melter 500. Thus, in various embodiments, a brush seal 602 or other sealing device is used to individually seal both the freezing zone 502 and the melting zone 504 of the rotating freezer/melter 500. Sealing both the freezing zone 502 and the melting zone 504 of the rotating freezer/melter 500 prevents gases or liquids from flowing from the freezing zone 502 to the melting zone 504, or vice versa. U.S. Patent Application Publication No. 2008/0251234 by Wilson et al. and U.S. Patent Application Publication No. 2009/0000762 by Wilson et al. describe a rotary air-preheater using brush seals and other sealing improvements that may be adapted to seal the freezing and melting zones 502 and 504 of the rotating freezer/melter 500.

Furthermore, the freezing zone 502 and the melting zone 504 may include separate inlets and outlets to allow gases or liquids to flow into and out of the two zones 502 and 504 of the rotating freezer/melter 500 without mixing. Specifically, the freezing zone 502 includes a freezer inlet 604 and a freezer outlet 606. The multiphase stream 510 may flow into the freezing zone 502 via the freezer inlet 604, and the inert gas stream 512 may flow out of the freezing zone 502 via the freezer outlet 606. The melting zone 504 includes a melter inlet 608 and a melter outlet 610. The high-pressure, high-temperature $CO_2$ stream 514 flows into the melting zone 504 via the melter inlet 608, and the liquid $CO_2$ stream 516 flows out of the melting zone 504 via the melter outlet 610. Therefore, the freezing zone 502 and the melting zone 504 of the rotating freezer/melter 500 include separate flow paths that are only connected via the rotor 506.

FIG. 6 is not intended to indicate that the rotating freezer/melter 500 is to include all of the components shown in FIG. 6. Moreover, the rotating freezer/melter 500 may include any number of additional components not shown in FIG. 6, depending on the details of the specific implementation.

Figure 7:
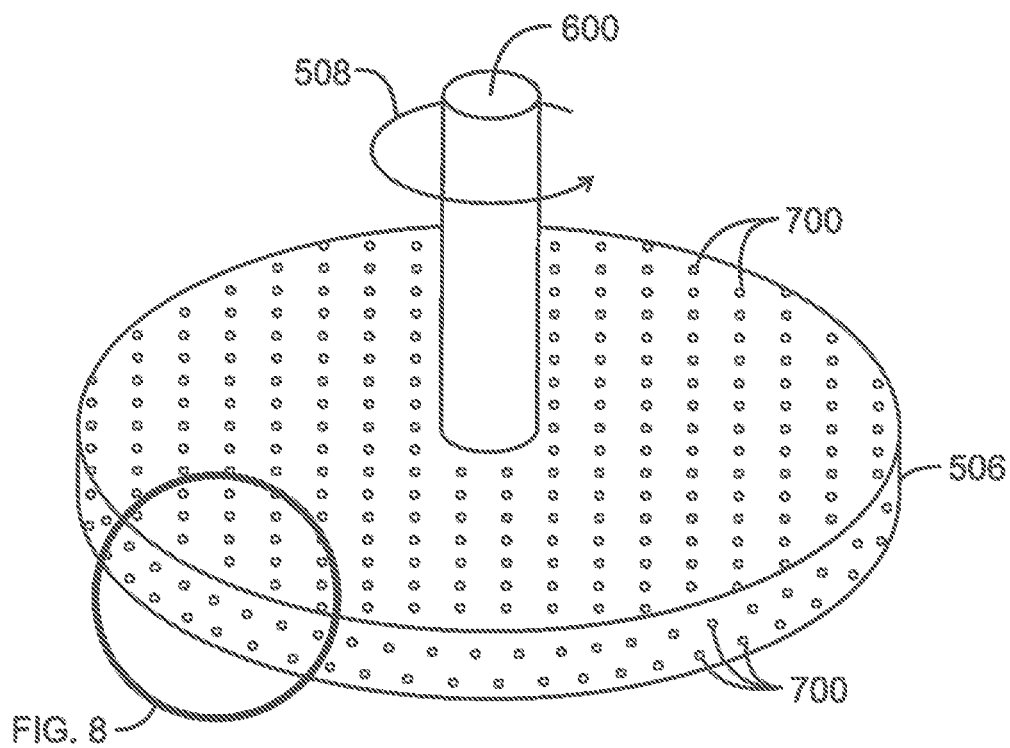
FIG. 7 is a perspective view of the rotor of the rotating freezer/melter of FIGS. 5 and 6.

FIG. 7 is a perspective view of the rotor 506 of the rotating freezer/melter 500 of FIGS. 5 and 6. As shown in FIG. 7, the rotor 506 may be constructed of a material including a number of pores 700, such as porous ceramic, for example. The pores 700 may provide enough surface area for solid $CO_2$ to accumulate on the rotor 506 without blocking the flow of gases or liquids through the rotor 506. The flow path for the flow of gases or liquids through the rotor 506 may vary depending on specific conditions, as discussed further with respect to FIG. 8.

FIG. 7 is not intended to indicate that the rotor 700 is to include all of the components shown in FIG. 7. Moreover, the rotor 700 may include any number of additional components not shown in FIG. 7, depending on the details of the specific implementation.

Figure 8:
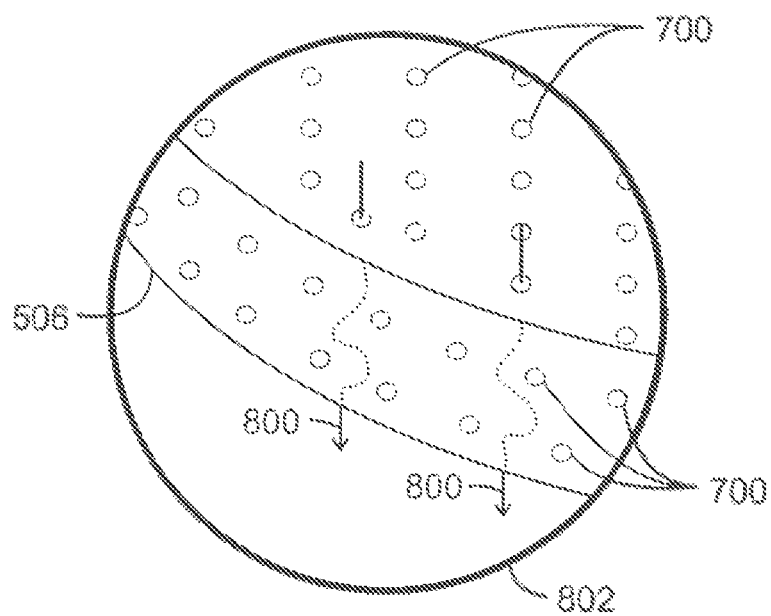
FIG. 8 is a schematic showing flow paths within a section of the rotor of FIG. 7.

FIG. 8 is a schematic showing flow paths 800 within a section 802 of the rotor 506 of FIG. 7. As shown in FIG. 8, the pores 700 within the rotor 506 may cause the flow path 800 for a substance passing through the rotor 506 to be tortuous rather than straight. Moreover, the flow path 800 may vary depending on specific conditions. In particular, the flow path 800 of a substance passing through the rotor 506 may depend at least in part on whether the pores are evenly or unevenly spaced, and whether the pores 700 are of a uniform size or differing sizes. In addition, the flow path 800 for a substance passing through the rotor 506 may depend on whether the substance is in the gas phase or the liquid phase, as well as the pressure and temperature of the substance.

The schematic of FIG. 8 is not intended to indicate that the gas flow paths 800 within the rotor 700 are to be exactly as shown in FIG. 8. Rather, the gas flow paths 800 within the rotor 700 may include any suitable variation of those shown in FIG. 7, depending on the details of the specific implementation.

Figure 9:
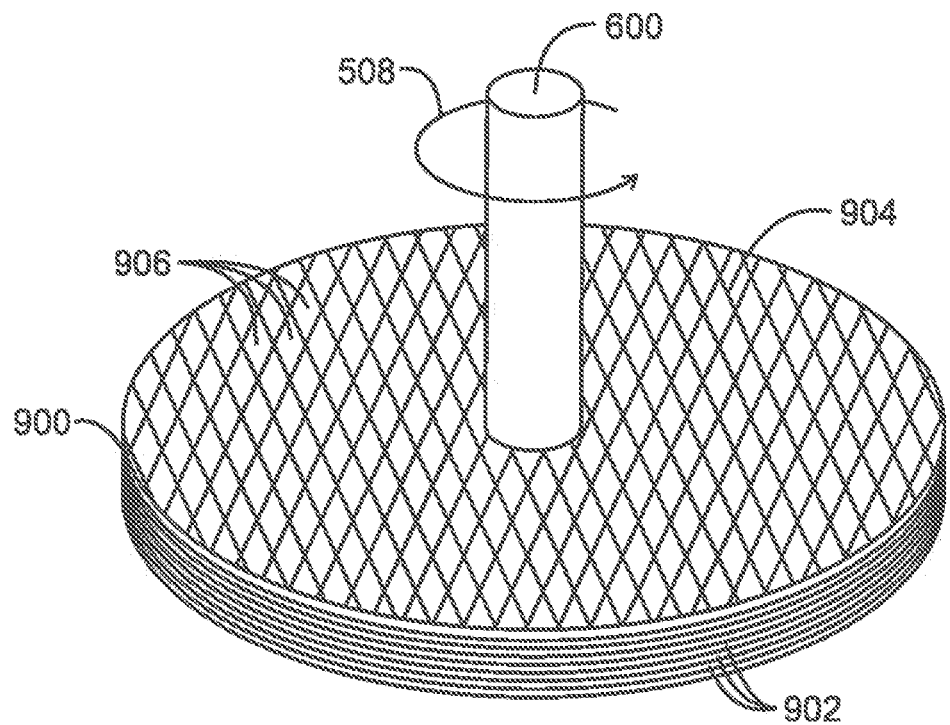
FIG. 9 is a perspective view of another rotor that may be used for the rotating freezer/melter of FIGS. 5 and 6.

FIG. 9 is a perspective view of another rotor 900 that may be used for the rotating freezer/melter 500 of FIGS. 5 and 6. As shown in FIG. 9, the rotor 900 includes a number of layers 902 of metal mesh screens 904. Each metal mesh screen 904 may include a number of small holes 906. The holes 906 may provide enough surface area for solid $CO_2$ to accumulate on the rotor 900 without blocking the flow of the gases or liquids through the rotor 900. The flow path for the flow of gases or liquids through the rotor 900 may vary depending on conditions that are similar to those discussed with respect to FIG. 8.

FIG. 9 is not intended to indicate that the rotor 900 is to include all of the components shown in FIG. 9. Moreover, the rotor 900 may include any number of additional components not shown in FIG. 9, depending on the details of the specific implementation.

Method for Power Generation and $CO_2$ Recovery

Figure 10:
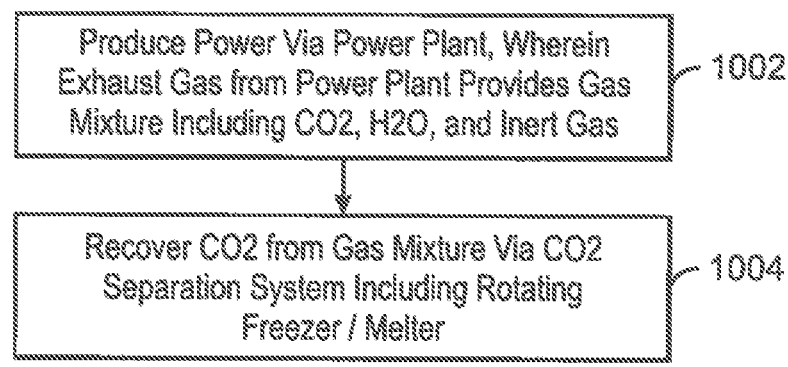
FIG. 10 is a process flow diagram of a method for power generation and $CO_2$ recovery.

FIG. 10 is a process flow diagram of a method 1000 for power generation and $CO_2$ recovery. The method 1000 may be implemented by any of the systems 100-400 described with respect to FIGS. 1-4. The method 1000 may also be implemented by any variation of the systems 100-400 described with respect to FIGS. 1-4, or any suitable alternative system that is capable of integrating power generation with $CO_2$ recovery. Furthermore, in various embodiments, the rotating freezer/melter 500 discussed with respect to FIGS. 5-9 may be used to implement the method 1000.

The method 1000 begins at block 1002, at which power is produced via a power plant. An exhaust gas from the power plant provides a gas mixture including $CO_2$, $H_2O$, and inert gas. The inert gas may include nitrogen, argon, and any number of other trace gases.

In various embodiments, producing power via the power plant includes providing mechanical energy via an expander turbine of a gas turbine engine using energy extracted from the gas mixture after combustion of the gas mixture in a combustor and generating electricity via a generator using the mechanical energy provided by the expander turbine. Further, in various embodiments, producing power via the power plant also includes generating steam via a HRSG by heating a boiler with an exhaust stream from the expander turbine, providing mechanical energy via a steam turbine using energy extracted from the steam generated by the HRSG, and generating electricity via a generator using the mechanical energy provided by the steam turbine. In some embodiments, one common generator is used to generate electricity from the mechanical energy provided by the expander turbine and the steam turbine, while, in other embodiments, separate generators are used.

At block 1004, the $CO_2$ is recovered from the gas mixture via a $CO_2$ separation system including a rotating freezer/melter. This may be accomplished by capturing solid $CO_2$ on a rotor of the rotating freezer/melter while the rotor is in a freezing zone of the rotating freezer/melter and flowing an inert gas stream through the rotor while the rotor is in the freezing zone. The solid $CO_2$ that is captured on the rotor may be melted to form liquid $CO_2$ while the rotor is in a melting zone of the rotating freezer/melter, and the liquid $CO_2$ may be flowed through the rotor while the rotor is in the melting zone.

In some embodiments, a portion of the liquid $CO_2$ is recycled to the melting zone of the rotating freezer/melter and is used to melt the solid $CO_2$ within the melting zone. In addition, in some embodiments, residual $CO_2$ is recovered from the inert gas stream exiting the rotating melter/freezer via a $CO_2$ separation device downstream of the freezing zone of the rotating freezer/melter. The recovered $CO_2$ may be pressurized via a compressor to produce a pressurized $CO_2$ vapor stream, and the pressurized $CO_2$ vapor stream may be used to melt the solid $CO_2$ within the melting zone of the rotating freezer/melter.

Furthermore, in some embodiments, the $H_2O$ is removed from the gas mixture via a dehydration system upstream of the $CO_2$ separation system. In addition, the solid $CO_2$ may be formed from the $CO_2$ within the gas mixture using a heat exchanger and an expander upstream of the rotating freezer/melter.

The process flow diagram of FIG. 10 is not intended to indicate that the steps of the method 1000 are to be executed in any particular order, or that all of the steps of the method 1000 are to be included in every case. Further, any number of additional steps may be included within the method 1000, depending on the details of the specific implementation.

Figure 11:
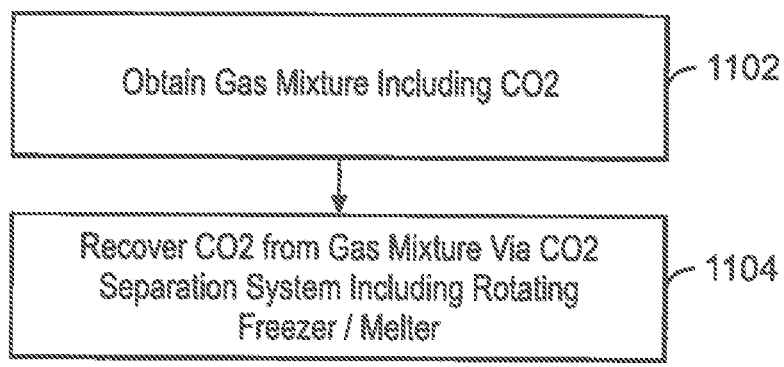
FIG. 11 is a generalized process flow diagram of a method for recovering $CO_2$ from a gas mixture.

FIG. 11 is a generalized process flow diagram of a method 1100 for recovering $CO_2$ from a gas mixture. The method 1100 may be used to recover $CO_2$ from any gas mixture including a substantial amount of $CO_2$. For example, in some embodiments, the method 1100 is used to remove $CO_2$ from an exhaust gas exiting a power plant. In such embodiments, the method 1000 may be implemented by any of the systems 100-400 described with respect to FIGS. 1-4, for example. In other embodiments, the method 1100 is used to remove $CO_2$ from a natural gas stream including a substantial amount of $CO_2$. In such embodiments, the method 1100 may be implemented by the system 1200 discussed with respect to FIG. 12. Furthermore, in various embodiments, the rotating freezer/melter 500 discussed with respect to FIGS. 5-9 may be used to implement the method 1100.

The method 1100 begins at block 1102, at which a gas mixture including $CO_2$ is obtained. The gas mixture may also include any number of other gaseous components. For example, the gas mixture may be an exhaust gas including $CO_2$, nitrogen, and any number of other inert gases, or the gas mixture may be a natural gas stream including natural gas, $CO_2$, and any number of other residual gases.

At block 1104, the $CO_2$ is recovered from the gas mixture via a $CO_2$ separation system including a rotating freezer/melter. This may be accomplished by capturing solid $CO_2$ on a rotor of the rotating freezer/melter while the rotor is in a freezing zone of the rotating freezer/melter and flowing the gas mixture through the rotor while the rotor is in the freezing zone. The solid $CO_2$ that is captured on the rotor may be melted to form liquid $CO_2$ while the rotor is in a melting zone of the rotating freezer/melter. The liquid $CO_2$ may then be flowed through the rotor while the rotor is in the melting zone and recovered as the $CO_2$ product.

The process flow diagram of FIG. 11 is not intended to indicate that the steps of the method 1100 are to be executed in any particular order, or that all of the steps of the method 1100 are to be included in every case. Further, any number of additional steps may be included within the method 1100, depending on the details of the specific implementation.

System for Recovering $CO_2$ from Natural Gas

Figure 12:
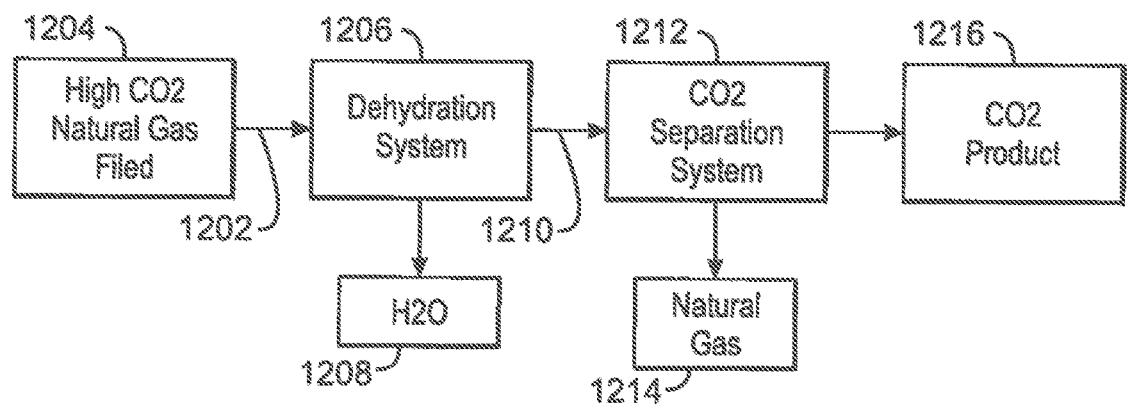
FIG. 12 is a block diagram of a system for recovering $CO_2$ from a natural gas stream.

FIG. 12 is a block diagram of a system 1200 for recovering $CO_2$ from natural gas. In the system 1200, a high $CO_2$ natural gas stream 1202 is obtained from a high $CO_2$ natural gas field 1204. The high $CO_2$ natural gas stream 1202 is flowed through a dehydration system 1206. Within the dehydration system 1206, $H_2O$ 1208 is separated from the high $CO_2$ natural gas stream 1202, producing a dehydrated high $CO_2$ natural gas stream 1210.

The dehydrated high $CO_2$ natural gas stream 1210 is then flowed into a $CO_2$ separation system 1212. Within the $CO_2$ separation system 1212, $CO_2$ is separated from the dehydrated high $CO_2$ natural gas stream 1216, producing a purified natural gas stream 1214 and a $CO_2$ product stream 1216. In various embodiments, this is accomplished using a rotating freezer/melter within the $CO_2$ separation system 1212, such as the rotating freezer/melter 500 discussed with respect to FIGS. 5-9.

The block diagram of FIG. 12 is not intended to indicate that the system 1200 is to include all of the components shown in FIG. 12. Moreover, the system 1200 may include any number of additional components not shown in FIG. 12, depending on the details of the specific implementation.

While the present techniques may be susceptible to various modifications and alternative forms, the exemplary embodiments discussed herein have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for recovering carbon dioxide ($CO_2$), comprising:
receiving, in a $CO_2$ separation system, a gas mixture from a power plant, wherein the gas mixture comprises $CO_2$, and the $CO_2$ separation system comprises:
a rotating freezer/melter having a freezing zone, a melting zone, and a rotor;
a $CO_2$ separation device downstream of the freezing zone of the rotating freezer/melter; and
a compressor downstream of the $CO_2$ separation device;
flowing the gas mixture through the rotor while the rotor is in the freezing zone;
capturing solid $CO_2$ from the gas mixture on the rotor while the rotor is in the freezing zone;
melting the solid $CO_2$ captured on the rotor while the rotor is in the melting zone, thereby forming liquid $CO_2$;
flowing the liquid $CO_2$ through the rotor while the rotor is in the melting zone;
maintaining the melting zone at a higher pressure than the freezing zone to preserve the melted $CO_2$ in a liquid state as it exits the melting zone;
routing the remaining gas mixture out of the freezing zone and into the $CO_2$ separation device;
recovering residual $CO_2$ from the remaining gas mixture using the $CO_2$ separation device;
pressurizing the residual $CO_2$ using the compressor to produce a pressurized $CO_2$ vapor stream; and
using the pressurized $CO_2$ vapor stream to melt the solid $CO_2$ within the melting zone of the rotating freezer/melter.

2. The method of claim 1, further comprising pumping at least a portion of the melted $CO_2$ using a pump disposed downstream of the rotating freezer/melter, thereby generating pressurized liquid $CO_2$.

3. The method of claim 2, further comprising converting the pressurized liquid $CO_2$ to a vapor $CO_2$ stream using a refrigeration load.

4. The method of claim 3, further comprising using the refrigeration load to chill cooling water for the power plant.

5. The method of claim 3, further comprising using the vapor $CO_2$ stream in enhanced oil recovery (EOR) operations.

6. The method of claim 1, further using a dehydration system to remove $H_2O$ from the gas mixture prior to receiving the gas mixture in the $CO_2$ separation system.

7. The method of claim 1, wherein the $CO_2$ separation system further comprises a heat exchanger and a first expander.

8. The method of claim 7, further comprising, prior to flowing the gas mixture through the rotor:
cooling the gas mixture using the heat exchanger; and
flowing the gas mixture through the first expander, thereby forming solid $CO_2$ from at least a portion of the $CO_2$ in the gas mixture.

9. The method of claim 8, wherein the gas mixture is cooled via indirect heat exchange.

10. The method of claim 8, further comprising flowing the remaining gas mixture to the heat exchanger prior to routing the remaining gas mixture to the $CO_2$ separation device, wherein the heat exchanger cools the gas mixture via indirect exchange with the remaining gas mixture.

11. The method of claim 8, wherein the first expander lowers the pressure and temperature of the gas mixture thereby freezing at least a portion of $CO_2$ within the gas mixture to pure solid $CO_2$.

12. The method of claim 1, wherein the $CO_2$ separation device recovers the residual $CO_2$ from the remaining gas mixture via a potassium carbonate separation process.

13. The method of claim 1, further comprising:
recycling a portion of the liquid $CO_2$ to the melting zone of the rotating freezer/melter; and
using the portion of the liquid $CO_2$ to melt the solid $CO_2$ within the melting zone.

14. The method of claim 1, wherein an exhaust gas from the power plant provides the gas mixture.

15. The method of claim 1, comprising producing power via the power plant.

16. The method of claim 15, wherein producing power via the power plant comprises:
providing mechanical energy via an expander turbine using energy extracted from the gas mixture after combustion of the gas mixture in a combustor; and
generating electricity via a generator using the mechanical energy provided by the expander turbine.

17. The method of claim 15, wherein producing the power via the power plant comprises:
providing mechanical energy via an expander turbine using energy extracted from the gas mixture after combustion of the gas mixture in a combustor;
generating steam via a heat recovery steam generator (HRSG) by heating a boiler with an exhaust stream from the expander turbine;
providing mechanical energy via a steam turbine using energy extracted from the steam generated by the HRSG; and generating electricity via a generator using the mechanical energy provided by the expander turbine and the steam turbine.

18. The method of claim 1, further comprising recycling a portion of the gas mixture to the power plant.

* * * * *